US012561632B2

(12) United States Patent
Cosenza et al.

(10) Patent No.: US 12,561,632 B2
(45) Date of Patent: Feb. 24, 2026

(54) SYSTEMS AND METHODS FOR STATE MANAGEMENT AND WORKFLOW COMPLETION

(71) Applicant: JPMORGAN CHASE BANK, N.A., New York, NY (US)

(72) Inventors: Giacinto Cosenza, London (GB); Gloria Wan, London (GB); Nancy Nugent, New York, NY (US); Niraj Gandhi, Bangalore (IN)

(73) Assignee: JPMORGAN CHASE BANK, N.A., New York, NY (US)

( * ) Notice: Subject to any disclaimer, the term of this patent is extended or adjusted under 35 U.S.C. 154(b) by 165 days.

(21) Appl. No.: 17/813,255

(22) Filed: Jul. 18, 2022

(65) Prior Publication Data

US 2023/0394407 A1 Dec. 7, 2023

(30) Foreign Application Priority Data

Jun. 2, 2022 (IN) .............................. 202211031686

(51) Int. Cl.
*G06Q 10/0633* (2023.01)
*G06F 9/48* (2006.01)

(52) U.S. Cl.
CPC ....... *G06Q 10/0633* (2013.01); *G06F 9/4881* (2013.01)

(58) Field of Classification Search
CPC .......................... G06Q 10/0633; G06F 9/4881
See application file for complete search history.

(56) References Cited

U.S. PATENT DOCUMENTS 9,521,606 B1 * 12/2016 Costa .................... H04L 63/083
2003/0069949 A1 * 4/2003 Chan ................... H04L 41/0213
                                                      709/221

(Continued)

FOREIGN PATENT DOCUMENTS

EP          3598356 A1 * 1/2020 ............. G06F 8/658

OTHER PUBLICATIONS

Nadeem et al. "A Case for Microservices Orchestration Using Workflow Engines" (2022) (https://arxiv.org/pdf/2204.07210.pdf) (Year: 2022).*

(Continued)

*Primary Examiner* — Sujay Koneru
(74) *Attorney, Agent, or Firm* — GREENBERG TRAURIG LLP

(57) ABSTRACT

Systems and methods for state management and workflow completion are disclosed. An exemplary method may include receiving a request and data at an onboarding service; sending the request and data to an initiator service; initiating, by the initiator service and at a workflow orchestration engine, a workflow, wherein the workflow is initiated based on the request, and wherein the workflow includes a plurality of activities; registering, by the workflow orchestration engine, the workflow in a unique namespace; generating a worker instance in an application-level container at a compute node; sending, to the worker instance, an activity of the plurality of activities for completion of the activity by the worker instance; communicating, by the worker instance with at least one service, indicating, by the worker instance and to the workflow orchestration engine, that the activity is complete; and persisting, by the workflow orchestration engine, state data for the workflow.

6 Claims, 4 Drawing Sheets

(56)  References Cited

U.S. PATENT DOCUMENTS

| | | | |
|---|---|---|---|
| 2009/0241117 A1* | 9/2009 | Dasgupta | G06F 9/5038 |
| | | | 718/101 |
| 2010/0280962 A1* | 11/2010 | Chan | G06Q 10/10 |
| | | | 705/301 |
| 2014/0114706 A1* | 4/2014 | Blakely | G06Q 10/02 |
| | | | 705/5 |
| 2017/0048276 A1* | 2/2017 | Bailey | G06F 3/0482 |
| 2017/0206474 A1* | 7/2017 | McDonald | G07B 15/00 |
| 2018/0156831 A1* | 6/2018 | Raicu | G01N 35/025 |
| 2018/0182193 A1* | 6/2018 | Spittle | H04L 67/125 |
| 2019/0236485 A1* | 8/2019 | Stanley, III | H04L 67/303 |
| 2020/0167798 A1* | 5/2020 | Lee | G06N 20/20 |
| 2020/0177704 A1* | 6/2020 | Nucci | H04L 67/34 |
| 2021/0075701 A1* | 3/2021 | Kalpatapu | H04L 63/0823 |
| 2021/0367975 A1* | 11/2021 | Wood | H04L 41/5054 |

OTHER PUBLICATIONS

International Search Report and Written Opinion of the International Searching Authority, dated Sep. 2, 2023, from corresponding International Application No. PCT/US2023/067352.

* cited by examiner

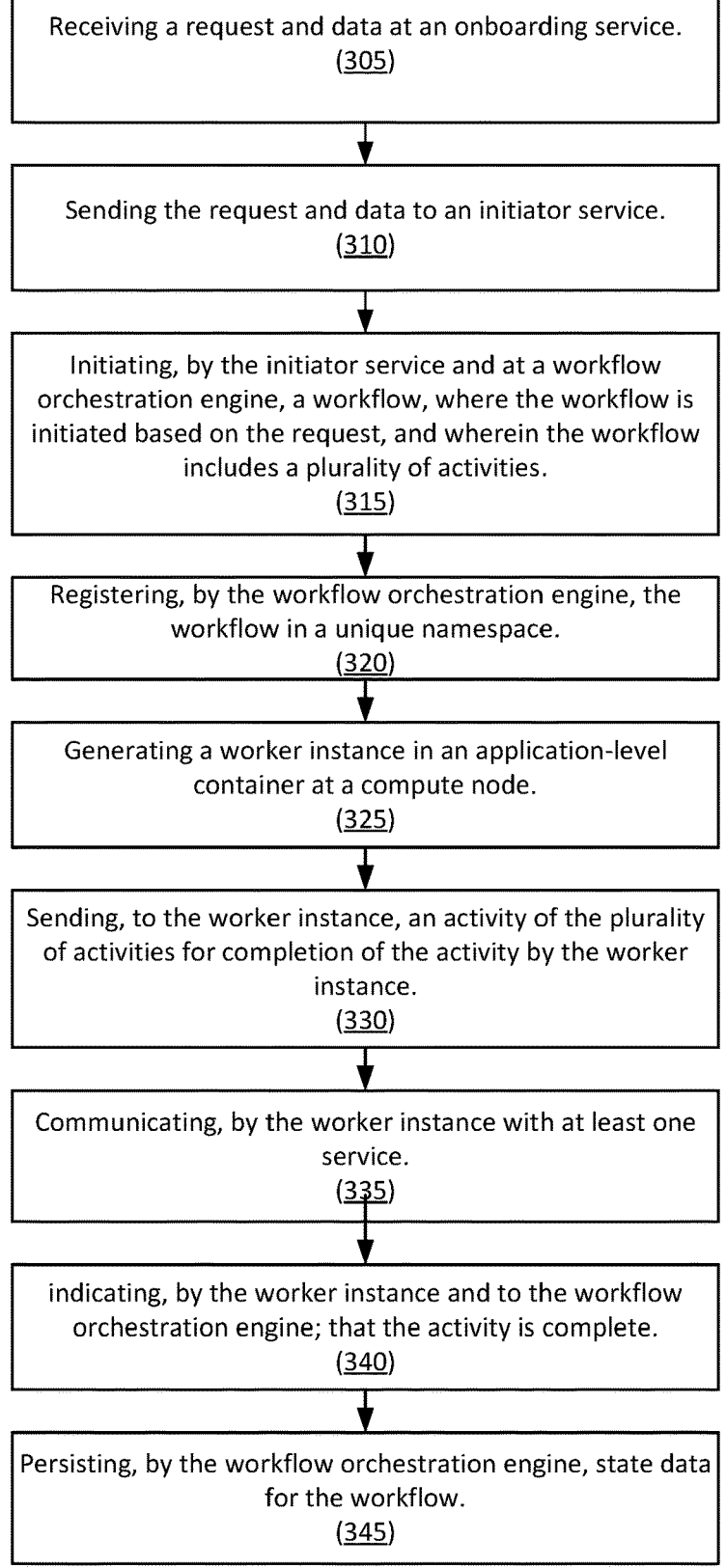

Receiving a request and data at an onboarding service.
(305)

Sending the request and data to an initiator service.
(310)

Initiating, by the initiator service and at a workflow orchestration engine, a workflow, where the workflow is initiated based on the request, and wherein the workflow includes a plurality of activities.
(315)

Registering, by the workflow orchestration engine, the workflow in a unique namespace.
(320)

Generating a worker instance in an application-level container at a compute node.
(325)

Sending, to the worker instance, an activity of the plurality of activities for completion of the activity by the worker instance.
(330)

Communicating, by the worker instance with at least one service.
(335)

indicating, by the worker instance and to the workflow orchestration engine; that the activity is complete.
(340)

Persisting, by the workflow orchestration engine, state data for the workflow.
(345)

FIGURE 3

SYSTEMS AND METHODS FOR STATE MANAGEMENT AND WORKFLOW COMPLETION

RELATED APPLICATIONS

This application claims priority to, and the benefit of, Indian Provisional Patent Application Ser. No 202211031686, filed Jun. 2, 2022, the disclosure of which is hereby incorporated, by reference, in its entirety.

BACKGROUND

1. Field of the Invention

Aspects are generally related to systems and methods for automated state management and workflow completion.

2. Description of the Related Art

Any organization that offers services through technology platforms must, as an initial step, onboard customers to the offered platform. Conventionally, this process has required high levels of manual involvement by the offering organization. This is due to the extended and often interrupted sequence of activities that are required for onboarding. Onboarding activities generally must be carried out in a particular order, and understanding, maintaining and communicating the state of included activities among the various components of a technological infrastructure poses technical challenges.

SUMMARY

In some aspects, the techniques described herein relate to a method, including: receiving a request and data at an onboarding service; sending the request and data to an initiator service; initiating, by the initiator service and at a workflow orchestration engine, a workflow, wherein the workflow is initiated based on the request, and wherein the workflow includes a plurality of activities; registering, by the workflow orchestration engine, the workflow in a unique namespace; generating a worker instance in an application-level container at a compute node; sending, to the worker instance, an activity of the plurality of activities for completion of the activity by the worker instance; communicating, by the worker instance with at least one service, indicating, by the worker instance and to the workflow orchestration engine, that the activity is complete; and persisting, by the workflow orchestration engine, state data for the workflow.

In some aspects, the techniques described herein relate to a method, wherein the state data for the workflow includes an indication that that the activity has been completed.

In some aspects, the techniques described herein relate to a method, wherein the onboarding service is a webservice hosted by a webserver.

In some aspects, the techniques described herein relate to a method, wherein the workflow is one of a plurality of workflows predefined at the workflow orchestration engine.

In some aspects, the techniques described herein relate to a method, wherein the workflow orchestration engine orchestrates the plurality of workflows concurrently.

In some aspects, the techniques described herein relate to a method, wherein the workflow is a customer onboarding workflow for a service platform.

In some aspects, the techniques described herein relate to a method, wherein the compute node is one node in a plurality of cluster nodes managed by a cluster service.

In some aspects, the techniques described herein relate to a method, wherein the worker instance corresponds to a customer from which the request and data were received.

In some aspects, the techniques described herein relate to a method, wherein an additional request and additional data are received, and wherein, based on the additional request and additional data, the workflow orchestration engine sends a second activity of the plurality of activities to the worker instance for completion.

In some aspects, the techniques described herein relate to a method, wherein the worker instance communicates with a second service based on the second activity.

In some aspects, the techniques described herein relate to a method, wherein a first activity of the plurality of activities is associated with creating an administrative participant profile, and wherein a second activity of the plurality of activities is associated with registering network settings provided by a customer.

In some aspects, the techniques described herein relate to a system including at least one computing device including a processor, wherein the at least one computing device is configured to: receive a request and data at an onboarding service; send the request and data to an initiator service; initiate, by the initiator service and at a workflow orchestration engine, a workflow, wherein the workflow is initiated based on the request, and wherein the workflow includes a plurality of activities; register, by the workflow orchestration engine, the workflow in a unique namespace; generate a worker instance in an application-level container at a compute node; send, to the worker instance, an activity of the plurality of activities for completion of the activity by the worker instance; communicate, by the worker instance with at least one service, indicate, by the worker instance and to the workflow orchestration engine, that the activity is complete; and persist, by the workflow orchestration engine, state data for the workflow.

In some aspects, the techniques described herein relate to a system, wherein the state data for the workflow includes an indication that that the activity has been completed.

In some aspects, the techniques described herein relate to a system, wherein the onboarding service is a webservice hosted by a webserver.

In some aspects, the techniques described herein relate to a system, wherein the workflow is one of a plurality of workflows predefined at the workflow orchestration engine.

In some aspects, the techniques described herein relate to a system, wherein the workflow orchestration engine orchestrates the plurality of workflows concurrently.

In some aspects, the techniques described herein relate to a system, wherein the workflow is a customer onboarding workflow for a service platform.

In some aspects, the techniques described herein relate to a system, wherein the compute node is one node in a plurality of cluster nodes managed by a cluster service.

In some aspects, the techniques described herein relate to a system, wherein the worker instance corresponds to a customer from which the request and data were received.

In some aspects, the techniques described herein relate to a system, wherein an additional request and additional data are received, and wherein, based on the additional request and additional data, the workflow orchestration engine sends a second activity of the plurality of activities to the worker instance for completion.

In some aspects, the techniques described herein relate to a non-transitory computer readable storage medium, including instructions stored thereon, which when read and executed by one or more computers cause the one or more computers to perform steps including: receiving a request and data at an onboarding service; sending the request and data to an initiator service; initiating, by the initiator service and at a workflow orchestration engine, a workflow, wherein the workflow is initiated based on the request, and wherein the workflow includes a plurality of activities; registering, by the workflow orchestration engine, the workflow in a unique namespace; generating a worker instance in an application-level container at a compute node; sending, to the worker instance, an activity of the plurality of activities for completion of the activity by the worker instance; communicating, by the worker instance with at least one service, indicating, by the worker instance and to the workflow orchestration engine, that the activity is complete; and persisting, by the workflow orchestration engine, state data for the workflow.

BRIEF DESCRIPTION OF THE DRAWINGS

FIG. 3 is a logical flow for daily retraining of a ML model, in accordance with aspects.

DETAILED DESCRIPTION

Figure 1:
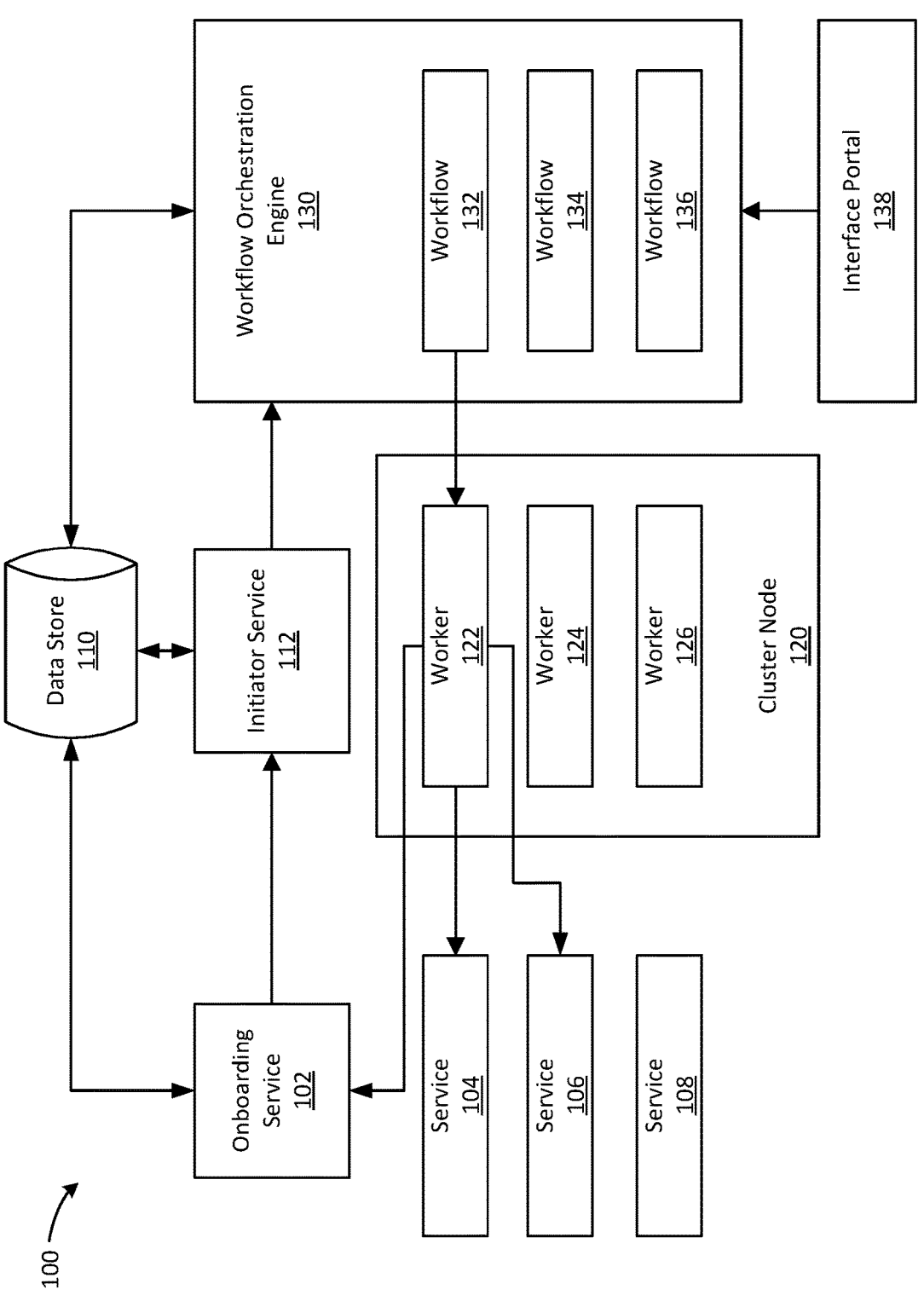
FIG. 1 is a block diagram of a system for onboarding a customer to a framework, in accordance with aspects.

Aspects are generally related to systems and methods for automated state management and workflow completion.

Onboarding of customers to an organization's service platform presents an exemplary situation where workflows are carried out in a sequential or partially sequential order, and where a state of the workflow must be maintained and referenced throughout the onboarding process. For instance, for a given service offering where a customer's infrastructure will interact with the offering organization's service platform, an administrative user/profile must be created, network settings must be registered and firewalls configured, legal documents must be signed by both parties appropriate to the domicile of the customer, blockchain and API configurations must be completed, other user accounts must be created, permissions for desired services must be set per user, etc. Disclosed herein are technological systems and corresponding methods that facilitate a defined workflow and state management thereof, allowing for these and other exemplary activities to be highly automated from the offering organization's perspective.

As used herein, a customer can include an institution that initiates on onboarding request to an offering organization. An offering organization is an organization whose commercial offerings can include technology service platforms and services to customers. A service platform can include back and front-end technical infrastructure that facilitates a commercial offering from an offering organization.

In accordance with aspects, an interface can be provided that allows a customer to instruct the subscription of a service and provide data required to execute a workflow for onboarding the customer to the offered service. Systems and logic for carrying out the workflow can be configured according to an offering organization's requirements and to maintain the state of the workflow, so that the process can be carried out over interrupted time frames and distributed among different participants. Customer input can be received from the interface (e.g., a webpage/site) at a backend server/service (e.g., a webserver).

In accordance with aspects, an initiator service can include a web interface that captures an onboarding request and required data from a customer, hosts workflow logic throughout an onboarding process, displays the onboarding journey to customers and the offering organization with respect to a specific service platform onboarding experience requested by a customer. An initiator service can receive a customer request to start a workflow (e.g., an onboarding workflow) and customer data. The initiator service can persist the received customer data to a datastore and initiate registration of a workflow that corresponds to the customer's request at a workflow orchestration service. The workflow can be registered in a namespace that is unique to, and associated with, the customer. An initiator service can be further configured to display customer's onboarding activities, a status of completion of a requested onboarding, and outstanding actions at a customer's institution level or an individual service subscription level.

An initiator service can function as a channel between the onboarding server/service and a workflow orchestration engine. When an onboarding service receives data/requests from a customer, the initiator can capture the requests and data, and make calls to the workflow orchestration engine. The workflow orchestration engine can communicate with an instance of a worker, and the communication can indicate that an event of a particular type (and, in some aspects, corresponding data) has been received (e.g., a new request has been received and/or data form a particular form that corresponds with a workflow activity has been submitted). A worker includes logic for utilizing the received request and data and working with associated services to complete an associated activity of the registered workflow.

In accordance with aspects, a workflow and a worker can sit in an idle state while it waits for required data or input from a customer. The initiator service and the workflow orchestration engine can be responsible for managing the state of the workflow and the customer input/data in order to maintain the state of the workflow (e.g., which activities included in the registered workflow have been completed, which are in progress, and which have not yet been initiated).

FIG. 1 is a block diagram of a system for onboarding a customer to a framework, in accordance with aspects. System 100 includes onboarding service 102, service 104, service 106, service 108, datastore 110, and initiator service 112. Onboarding service 102 can provide forms and other interfaces that prompt a customer to input data that the framework requires for an onboarding workflow. Onboarding service 102 can store any data received in datastore 110. Datastore 110 can be any suitable datastore such as a relational database, a data warehouse, data lake, etc. In accordance with aspects, datastore 110 can represent one centralized datastore or several specific datastores for the various components discussed herein. That is, components such as onboarding service 102, initiator service 112, and/or workflow orchestration engine 130 may all utilize a central datastore or may be configured to utilize several specific datastores. One or many datastores can be configured with different schemas for storing data according to each schema (e.g., a schema for onboarding data, a schema for orchestration services data, etc.).

Services 104, 106, and 108 can be applications provided by an organization that are configured to perform a particular task within the technology infrastructure of the platform providing organization. Services 104, 106 and 108 can be microservices, in that they provide fine-grained services, are independently deployable, are loosely coupled to other services, use lightweight and technology-agnostic protocols, are small in size, etc.

System 100 of FIG. 1 further includes initiator service 112, workflow orchestration engine 130, and cluster node 120. Initiator service 112 can receive a request and/or data from onboarding service 102 and based on the request and/or data received, can initiate a workflow (e.g., an onboarding workflow) or a particular activity of a previously initiated workflow at orchestration engine 130. Initiator service 112 can receive requests and data from a customer-facing front-end interface (such as a webpage, mobile app, etc.) of, e.g., a web server or application server of onboarding service 102. Initiator service 112 can be configured as an intermediate service between onboarding service 102 and workflow orchestration engine 130.

Workflow orchestration engine 130 can execute defined workflows initiated by initiator service 112. Initiator service 112 may retrieve customer data from datastore 110 and provide the data to workflow orchestration engine 130 or may provide pointers to customer data in datastore 110. Initiator service 112 may help with state management of workflows defined in workflow orchestration engine 130. For instance, initiator service 112 may manage incoming data from onboarding service 102 and communicate with datastore 110 to maintain the state of the workflows that initiator service 112 initiates.

Workflow orchestration engine 130 can be configured to provide workflow orchestration services for workflows such as customer onboarding workflows. For example, workflow orchestration engine 130 can have one or more workflows defined, and can manage activities included in defined workflows. Workflow activities can be individual tasks that are organized and executed in a defined sequence. Workflow orchestration engine 130 may also be configured to manage namespaces for workflows. In accordance with aspects, a workflow namespace is a logical unit of isolation for a workflow. A workflow initiated in its own namespace (e.g., a unique namespace associated with a particular customer) will be isolated from other workflows and can execute concurrently with other workflows. Many instances of the same workflow can be initiated in separate namespaces, so that many customers can be performing the same workflow at the same time.

Workflows can be configured for many different platform offerings. Different platform offerings may require different activities to be performed, or similar activities to be performed in different orders, as part of an onboarding workflow. Exemplary activities that may be included in an onboarding workflow include configuring an admin user for the customer; configuring user containers and container permissions; configuring platform firewalls with necessary settings for receiving traffic from the onboarding customer; making a distributed network (e.g., a blockchain network) available to the onboarding customer; receiving, verifying, and persisting required legal documents from an onboarding customer (e.g., to a block of a blockchain network); etc.

Workflow orchestration engine 130 defines workflow 132, workflow 134, and workflow 136. Each of workflow 132, workflow 134, and workflow 136 may be defined to accomplish a particular undertaking, such as onboarding a customer to a particular offering of the platform. For instance, if a platform offers feature 1, feature 2 and feature 3, then workflow 132 may include activities necessary to onboard a customer to feature 1, workflow 134 may include activities necessary to onboard a customer to feature 2, and workflow 136 may include activities necessary to onboard a customer to feature 3.

Workflows are not limited to onboarding customers, and workflows as described herein, in the context of customer onboarding, are exemplary and not meant to be limiting. Workflows can be defined for any string of activities that require stateful execution of reentrant processes. Workflow orchestration engine 130 can also include interface portal 138, which is a user interface to workflow orchestration engine 130 that can be used to carry out and monitor administrative activities such as configuring workflows.

With continued reference to FIG. 1, cluster node 120 is a compute device that is node of a cluster of compute devices. For instance, a cluster service (not shown) may manage cluster node 120 and other clusters, providing services such as redundancy among nodes, load balancing among nodes, etc. Cluster node 120 may execute worker 122, worker 124, and worker 126. Cluster node 120 can execute the workers in an application-level container that virtualizes the application execution environment, so that each worker has its own runtime environment, application libraries, hardware allocations, etc. While worker 122, worker 124, and worker 126 are depicted as executing in their own application-level containers on cluster node 120, this configuration is exemplary only, and any suitable number of works can execute on any suitable number of cluster nodes.

In accordance with aspects, workers can correspond with customers that have initiated workflows. That is, for each customer that has prompted initiation of a workflow, a worker can execute each activity in the workflow and interact with the required services to complete the workflow. For example, if a customer has started the onboarding process to a platform and has provided some necessary information, and an initiator service has received the request and has initiated an appropriate workflow in the customer's unique namespace, then a worker executing in an application-level container can be dedicated to processing each activity in the initiated workflow. The dedicated worker can interact with the services necessary to complete each activity included in the initiated workflow.

A unique customer-associated workflow namespace and virtualized application-level container provide separation of customers' data from each other, and provide security in the form of logical separation of software application, while still allowing for hardware consolidation.

Referring again to FIG. 1, and in accordance with aspects, initiator service 112 may receive an onboarding request and corresponding data from onboarding service 102. Initiator service 112 may persist the corresponding data in datastore 110 and initiate workflow 132, which is defined in workflow orchestration engine 130. Workflow 132 may include several activities that define an onboarding process. Worker 122 may execute activities included in workflow 132 by interacting with different services, such as service 104 and service 106.

As worker 122 completes activities included in workflow 132, workflow orchestration engine 130 can send state information to datastore 110 in order to preserve the state of workflow 132. For instance, certain activities included in workflow 132 may be prerequisites to other activities included therein. Workflow orchestration engine 130 can persist state information as to which activities have been completed, which are in process, and which still need to be completed. Moreover, a task, such as onboarding to a platform, may be performed over several days by a customer. Initiator service 112 can also help in state management by determining finished activities, started but unfinished activities, and not-started activities of a workflow, and based on the state of a customer's workflow, indicate to onboarding service 102 to prompt the customer for the data needed next in an unfinished workflow. For instance, a customer may be directed to the page of on onboarding website where they last interacted with an onboarding service, based on the onboarding service's communications with the initiator service regarding state information.

System 100 may be included in the backend technology infrastructure of an organization. Such infrastructure can include servers, computers, software applications, computer network mediums, and computer networking hardware and software for providing electronic services based on computer software applications executing on requisite hardware. Exemplary hardware and software include webservers, application servers, database and data storage servers and appliances, communication servers such as email servers and SMS servers, network routers, switches and firewalls, custom-developed software applications including hardware to execute them on, etc. For example, each of service 102, initiator service 112, workflow orchestration engine 130, cluster node 120, and other components disclosed herein can include software executing on hardware as described above.

System components disclosed herein can each be communicatively coupled to each other via a communications network with appropriate hardware and software. For instance, components of system 100 can include a wired or wireless network interface card (NIC) that interfaces with the communications network and is configured with appropriate communication protocols for operative communication across the communications network. The communications network, itself, can include hardware (NICs, switches, routers, etc.) configured with appropriate protocols for facilitating intercommunication among network participants.

In accordance with aspects, communication at the application level between the different components disclosed herein can take place via application programming interface (API) calls between the components. Any suitable API service/protocol may be used, such as the remote procedure call (RPC) protocol.

Figure 2:
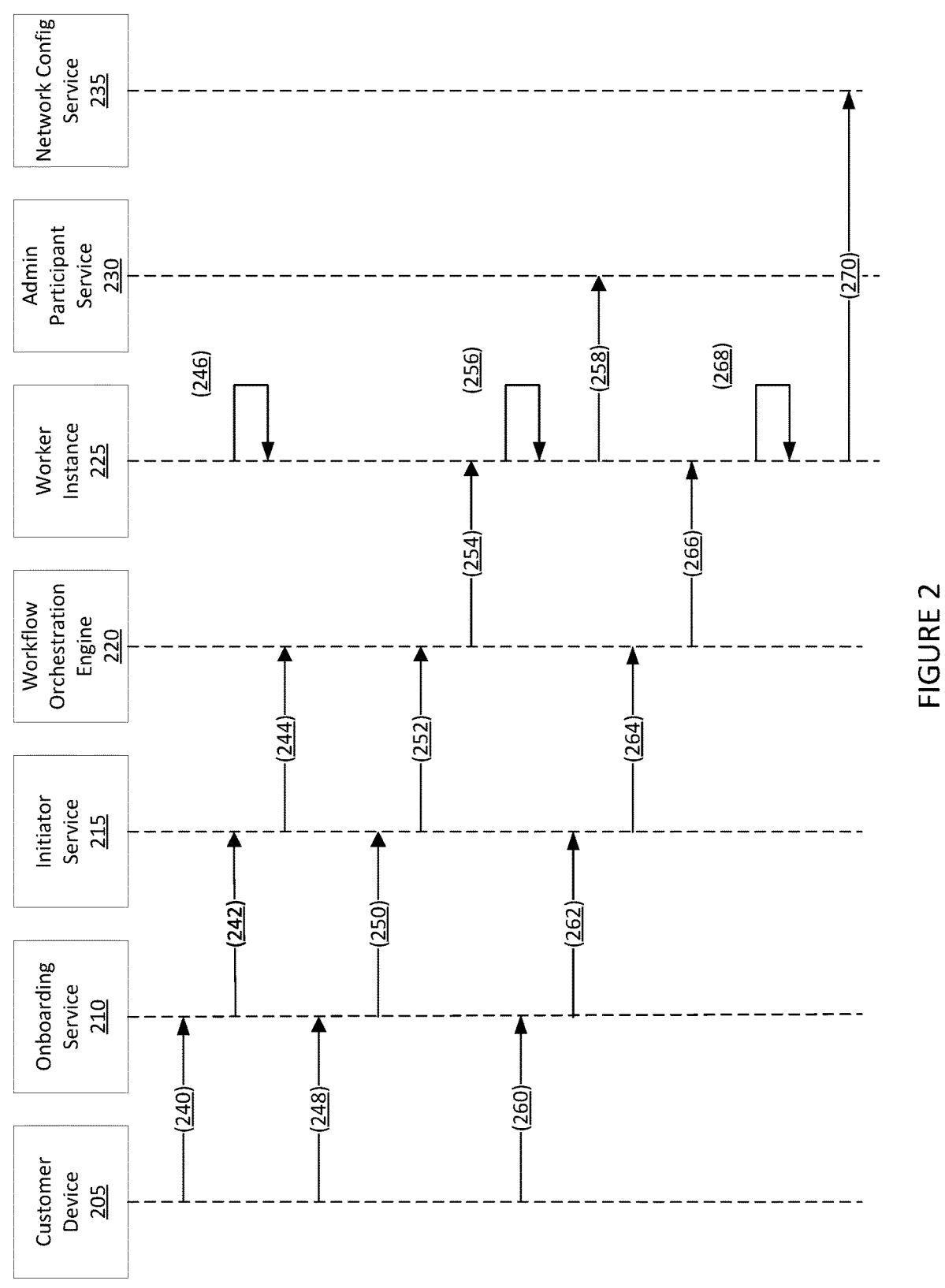
FIG. 2 is a sequence diagram of a system for frequent model retraining, in accordance with aspects.

FIG. 2 is a sequence diagram for customer onboarding to a framework, in accordance with aspects. At step 240, a customer of a service framework offered by a framework provider accesses onboarding service 210 of the framework from customer device 205. Onboarding service 210 can be, e.g., a web service provided by a webserver of the framework provider. The customer may access an interface, such as a webpage, using customer device 205, and the interface may be served by onboarding service 210. The interface of onboarding service 210 may prompt the user to indicate what platform service the user or user's organization would like to onboard to, and based on the user's response, may prompt the user for information required to complete an onboarding workflow for the indicated service.

At step 242 of FIG. 2, onboarding service 210 can send the information received by the customer to initiator service 215 along with the platform service indicated for onboarding. Initiator service 215 can persist the received customer data to a datastore and, at step 244, initiate the appropriate workflow for the indicated service to which the customer wishes to onboard, including registering the appropriate workflow in a dedicated namespace associated with the customer, with orchestration engine 220. At step 246, worker instance 225 can be registered in a virtualized application-level container based on the indicated workflow type and can be associated with the dedicated customer namespace.

At step 248 of FIG. 2, onboarding service 210 can prompt for information regarding an admin participant. An admin participant is a platform administrative user from the customer's organization. In accordance with aspects, an onboarding process can configure an administrative user as one of several initial steps in the onboarding process. By generating an administrative user profile and populating the administrative profile with appropriate user data as an initial step, the onboarding can subsequently interact with the administrative user having administrative privileges for the user's organization. The administrative participant profile, once created and configured, can then be used to self-configure items such as network settings, other user profiles, and take other steps in the custom configuration of the platform service on behalf of the user's organization.

At step 248, onboarding service 205 can prompt the user (via the user interface) for information for an administrative participant profile. At step 250, the onboarding service 210 can send the request to create an administrative participant profile and any required/received data (e.g., username, password, etc.) to initiator service 215. onboarding service 210 can also persist the received data in a datastore. At step 252, initiator service 215 can communicate the indicated activity that is responsible for creating and configuring the administrative participant user/profile from the registered workflow to workflow orchestration engine 220. The activity can invoke worker instance 225 and pass any needed parameters to worker instance 225 at step 254. Worker instance 225 can receive any parameters required for carrying out the action and perform any internal processing needed for the activity at step 256. Worker instance 225 can an interact with one or more appropriate services (e.g., admin participant service 230) at step 258.

Admin participant service 230 may be a micro service that is configured to complete one or more steps required to complete the activity, which, in this example, is creating and configuring an administrative participant user. Accordingly, at step 258, worker instance 225 can make calls to admin participant service 230, pass parameterized data to admin participant service 230, and receive data returned from admin participant service 230. When an activity is completed by worker instance 225, worker instance 225 may communicate the completion to orchestration engine 220 and orchestration engine 220 may persist any data needed to maintain the state of the registered/initiated workflow.

In accordance with aspects, after completion of the administrative participant profile creation/configuration, a subsequent step in the registered workflow may be registration of the participating organization's network settings (such as IP addresses, domain names, etc.). At step 260 of FIG. 2, onboarding service 210 may prompt for and receive network configuration data from customer device 205. At step 262, initiator service 215 can receive the network settings data from 210 along with a request to register and configure the customer's network setting data with the framework. At step 264, initiator service 215 can persist the data in a datastore and can initiate the corresponding activity of the registered workflow with orchestration engine 220.

At step 266, orchestration engine 220 can send required data and make required calls to worker instance 225, invoking worker instance 225 to begin the network setting registration process. Worker instance 225 can, in turn, make calls (e.g., API calls) to the appropriate services to complete the network setting registration for the customer's received network settings. For instance, worker instance 225 can, at step 270, make an API call to network config service 235 and pass parameterized network settings (as received from the customer in step (260) to network config service 235. Network config service 235, which can be a microservice, can execute its functionality using the data received in the API call from worker instance 225.

When network config service 235 has finished its execution, it can return data to worker instance 225. For instance, network config service 235 can send an indication of completion to worker instance 225, and worker instance 225 can relay this indication to orchestration engine 220. Orchestration engine 220 can update a datastore with the state of the activity. For example, if network config service 235 finished all processing of the initiated activity, then orchestration engine 220 can persist an indication that the activity is completed. Alternatively, if there was a failure, or if the initiated activity was only partially completed, then orchestration engine 220 can persist an indication of the partial state of completion of the activity.

The workflows, activities, and corresponding services described with respect to FIG. 2 are meant to be exemplary and not limiting. The sequence of steps described in FIG. 2 are applicable to any combination of workflow (with included activities), worker instance, and corresponding services for carrying out the activities that constitute a workflow. Other exemplary workflows can include making a distributed ledger network that is part of the offered framework available to the customer; completion and verification of legal documents (e.g., terms of service, etc.) by an onboarding customer, and persisting the documents to a distributed ledger; etc.

FIG. 3 is a logical flow for facilitating workflow completion while maintaining workflow state, in accordance with aspects. At step 305, an onboarding service can receive a request and corresponding data. At step 310, the request and data can be sent to an initiator service. At step 315, the initiator service can initiate, a workflow orchestration engine, a workflow, wherein the workflow is initiated based on the request, and wherein the workflow includes a plurality of activities. At step 320, the workflow orchestration engine can register the workflow in a unique namespace. At step 325, a worker instance can be generated in an application-level container at a compute node (e.g., a cluster node). At step 330, an activity of the plurality of activities can be sent to the worker instance for completion of the activity by the worker instance. At step 335, the worker instance can communicate with at least one service. At step 340, the worker instance can indicate to the workflow orchestration engine that the activity is complete. At step 345, the workflow orchestration engine can persist state data for the workflow.

Figure 4:
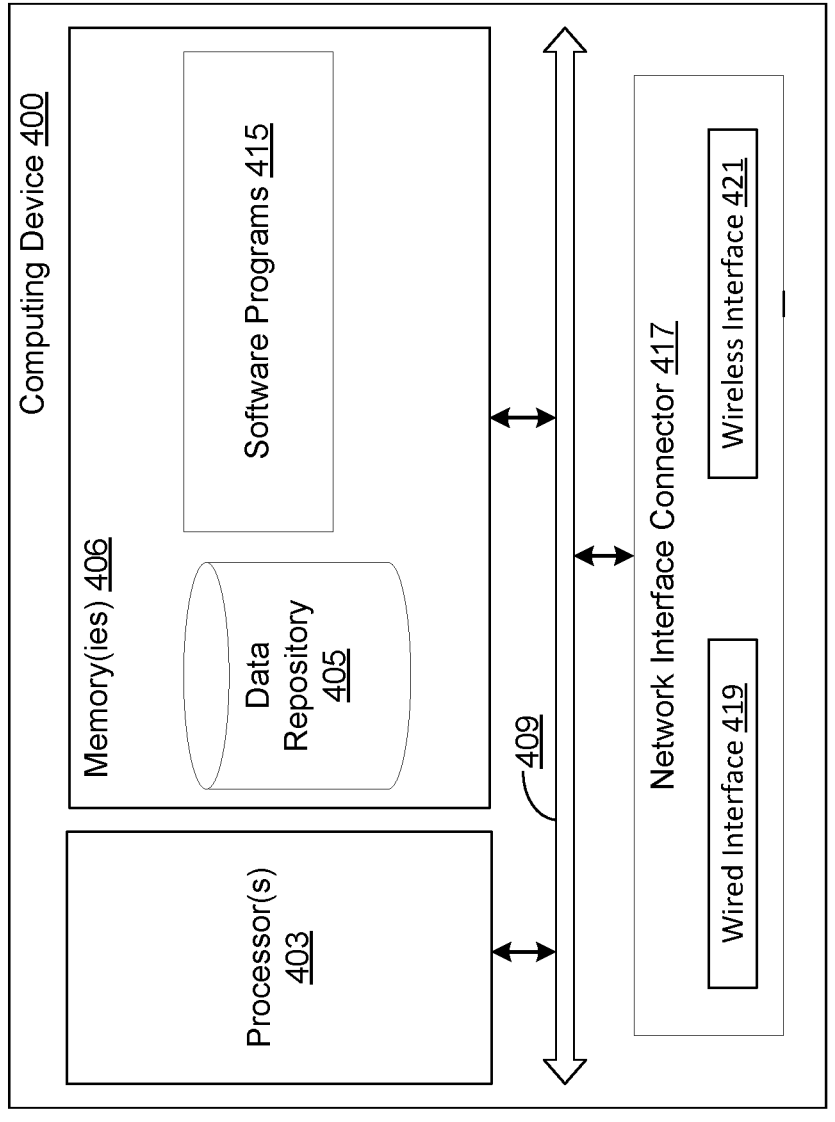
FIG. 4 is a block diagram of a computing device for implementing aspects of the present disclosure.

FIG. 4 is a block diagram of a computing device for implementing certain aspects of the present disclosure. FIG. 4 depicts exemplary computing device 400. Computing device 400 may represent the system components described herein. For example, system components such as service 102, initiator service 112, workflow orchestration engine 130, and/or cluster node 120 may include components and configurations like or similar to computing device 400. Computing device 400 includes a processor 403 coupled to a memory 406. The processor 403 executes computer-executable program code stored in memory 406, such as software programs 415. Software programs 415 may include one or more of the logical steps disclosed herein as a programmatic instruction, which can be executed by processor 403. Memory 406 may also include data repository 405, which may be nonvolatile memory for data persistence. The processor 403 and the memory 406 may be coupled by a bus 409. In some examples, the bus 409 may also be coupled to one or more network interface connectors 417, such as wired network interface 419, and/or wireless network interface 421. Computing device 400 may also have user interface components, such as a screen for displaying graphical user interfaces and receiving input from the user, a mouse, a keyboard and/or other input/output components (not shown).

The various processing steps and/or data flows depicted in the figures and described in greater detail herein may be accomplished using some or all of the system components also described herein. In some implementations, the described logical steps may be performed in different sequences and various steps may be omitted. Additional steps may be performed along with some or all of the steps shown in the depicted logical flow diagrams. Some steps may be performed simultaneously. Accordingly, the logical flows illustrated in the figures and described in greater detail herein are meant be exemplary and, as such, should not be viewed as limiting. These logical flows may be implemented in the form of executable instructions stored on a machine-readable storage medium and/or in the form of electronic circuitry.

Hereinafter, general aspects of implementation of the systems and methods of the invention will be described.

The system of the invention or portions of the system of the invention may be in the form of a "processing machine," such as a general-purpose computer, for example. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or activities, such as those activities described above. Such a set of instructions for performing a particular task may be characterized as a program, software program, or simply software.

In one aspect, the processing machine may be a specialized processor.

As noted above, the processing machine executes the instructions that are stored in the memory or memories to process data. This processing of data may be in response to commands by a user or users of the processing machine, in response to previous processing, in response to a request by another processing machine and/or any other input, for example.

As noted above, the processing machine used to implement the invention may be a general-purpose computer. However, the processing machine described above may also utilize any of a wide variety of other technologies including a special purpose computer, a computer system including, for example, a microcomputer, mini-computer or mainframe, a programmed microprocessor, a micro-controller, a peripheral integrated circuit element, a CSIC (Customer Specific Integrated Circuit) or ASIC (Application Specific Integrated Circuit) or other integrated circuit, a logic circuit, a digital signal processor, a programmable logic device such as a FPGA, PLD, PLA or PAL, or any other device or arrangement of devices that is capable of implementing the steps of the processes of the invention.

The processing machine used to implement the invention may utilize a suitable operating system. Thus, aspects of the invention may include a processing machine running the iOS operating system, the OS X operating system, the Android operating system, the Microsoft Windows™ operating systems, the Unix operating system, the Linux operating system, the Xenix operating system, the IBM AIX™ operating system, the Hewlett-Packard UX™ operating system, the Novell Netware™ operating system, the Sun Microsystems Solaris™ operating system, the OS/2™ operating system, the BeOS™ operating system, the Macintosh operating system, the Apache operating system, an Open-Step™ operating system or another operating system or platform.

It is appreciated that in order to practice the method of the invention as described above, it is not necessary that the processors and/or the memories of the processing machine be physically located in the same geographical place. That is, each of the processors and the memories used by the processing machine may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing, as described above, is performed by various components and various memories. However, it is appreciated that the processing performed by two distinct components as described above may, in accordance with a further aspect of the invention, be performed by a single component. Further, the processing performed by one distinct component as described above may be performed by two distinct components. In a similar manner, the memory storage performed by two distinct memory portions as described above may, in accordance with a further aspect of the invention, be performed by a single memory portion. Further, the memory storage performed by one distinct memory portion as described above may be performed by two memory portions.

Further, various technologies may be used to provide communication between the various processors and/or memories, as well as to allow the processors and/or the memories of the invention to communicate with any other entity; i.e., so as to obtain further instructions or to access and use remote memory stores, for example. Such technologies used to provide such communication might include a network, the Internet, Intranet, Extranet, LAN, an Ethernet, wireless communication via cell tower or satellite, or any client server system that provides communication, for example. Such communications technologies may use any suitable protocol such as TCP/IP, UDP, or OSI, for example.

As described above, a set of instructions may be used in the processing of the invention. The set of instructions may be in the form of a program or software. The software may be in the form of system software or application software, for example. The software might also be in the form of a collection of separate programs, a program module within a larger program, or a portion of a program module, for example. The software used might also include modular programming in the form of object oriented programming. The software tells the processing machine what to do with the data being processed.

Further, it is appreciated that the instructions or set of instructions used in the implementation and operation of the invention may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

Any suitable programming language may be used in accordance with the various aspects of the invention. Illustratively, the programming language used may include assembly language, Ada, APL, Basic, C, C++, COBOL, dBase, Forth, Fortran, Java, Modula-2, Pascal, Prolog, REXX, Visual Basic, and/or JavaScript, for example. Further, it is not necessary that a single type of instruction or single programming language be utilized in conjunction with the operation of the system and method of the invention. Rather, any number of different programming languages may be utilized as is necessary and/or desirable.

Also, the instructions and/or data used in the practice of the invention may utilize any compression or encryption technique or algorithm, as may be desired. An encryption module might be used to encrypt data. Further, files or other data may be decrypted using a suitable decryption module, for example.

As described above, the invention may illustratively be embodied in the form of a processing machine, including a computer or computer system, for example, that includes at least one memory. It is to be appreciated that the set of instructions, i.e., the software for example, that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in the invention may take on any of a variety of physical forms or transmissions, for example. Illustratively, the medium may be in the form of a compact disc, a DVD, an integrated circuit, a hard disk, a floppy disk, an optical disk, a magnetic tape, a RAM, a ROM, a PROM, an EPROM, a wire, a cable, a fiber, a communications channel, a satellite transmission, a memory card, a SIM card, or other remote transmission, as well as any other medium or source of data that may be read by the processors of the invention.

Further, the memory or memories used in the processing machine that implements the invention may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the system and method of the invention, a variety of "user interfaces" may be utilized to allow a user to interface with the processing machine or machines that are used to implement the invention. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, keypad, voice reader, voice recognizer, dialogue screen, menu box, list, checkbox, toggle switch, a pushbutton or any other device that allows a user to receive information regarding the operation of the processing machine as it processes a set of instructions and/or provides the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some aspects of the system and method of the invention, it is not necessary that a human user actually interact with a user interface used by the processing machine of the invention. Rather, it is also contemplated that the user interface of the invention might interact, i.e., convey and receive information, with another processing machine, rather than a human user. Accordingly, the other processing machine might be characterized as a user. Further, it is contemplated that a user interface utilized in the system and method of the invention may interact partially with another processing machine or processing machines, while also interacting partially with a human user.

It will be readily understood by those persons skilled in the art that the present invention is susceptible to broad utility and application. Many aspects and adaptations of the present invention other than those herein described, as well as many variations, modifications and equivalent arrangements, will be apparent from or reasonably suggested by the present invention and foregoing description thereof, without departing from the substance or scope of the invention.

Accordingly, while the present invention has been described here in detail in relation to its exemplary aspects, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such aspects, adaptations, variations, modifications or equivalent arrangements.

The invention claimed is:

1. A method, comprising:

receiving a request and data at an onboarding service executed by a webserver comprising one or more processors and from a webpage interface executed on a customer device comprising one or more processors;

sending the request and data from the onboarding service to an initiator service, wherein the webpage interface includes the initiator service and the initiator service stores the data in a datastore, wherein the initiator service is a channel between the onboarding service and a workflow orchestration engine executed by the webserver;

initiating, by the initiator service and at the workflow orchestration engine, a workflow via an application programming interface ("API"), wherein the workflow includes a plurality of activities, wherein the plurality of activities includes making a distributed network available to the onboarding service and receiving, verifying, and persisting documents from the onboarding service;

registering, by the workflow orchestration engine, the workflow in a unique namespace associated with the customer device that is isolated from other workflows and executes concurrently with the other workflows, the other workflows including a plurality of other requests and associated data received by the onboarding service from other customer devices;

generating, by the workflow orchestration engine, a worker instance of a plurality of worker instances in an application-level container that virtualizes an application execution environment so each worker instance of the plurality of worker instances has a runtime environment, application library, and hardware allocation, the application-level container being part of a compute node executed by the webserver, wherein the workflow orchestration engine sends a parameter to the worker instance, wherein the compute node is one node in a plurality of cluster nodes managed by a cluster service that balances load among the plurality of cluster nodes and provides redundancy among the cluster nodes;

receiving, by the workflow orchestration engine, an additional request and additional data;

generating, by the workflow orchestration engine, a second activity of the plurality of activities to send to the worker instance for completion, wherein the worker instance is in an idle state until it receives required data;

sending, to the worker instance, a task of a plurality of tasks of an activity of the plurality of activities for completion of the task by the worker instance according to the parameter, wherein the task is associated with setting a network configuration;

communicating, through an API call, by the worker instance with a network configuration service, to provide one or more parameterized network settings to the network configuration service;

generating, by the network configure service, based on the workflow and an administrative participant profile configuration associated with the participant profile, the administrative participant profile configuration including registering a participating organization's internet protocol (IP) address and domain name and configuring a platform firewall for receiving traffic from the customer device based on the parameterized network settings and the workflow;

executing, by the compute node, the plurality of tasks by the worker instance in the application-level container in a defined sequence, wherein the work calls to the network configuration service to complete the task;

indicating, by the worker instance and to the workflow orchestration engine that the activity is complete; and persisting, by the workflow orchestration engine, state data for the workflow in the datastore, wherein the state data for the workflow includes an indication that that the activity is complete.

2. The method of claim 1, wherein the workflow is one of a plurality of workflows predefined at the workflow orchestration engine.

3. A system comprising at least one computing device including a processor, wherein the at least one computing device is configured to:

receive a request and data at an onboarding service executed by a webserver comprising one or more processors and from a webpage interface executed on a customer device comprising one or more processors;

send the request and data from the onboarding service to an initiator service, wherein the webpage interface includes the initiator service and the initiator service stores the data in a datastore, wherein the initiator service is a channel between the onboarding service and a workflow orchestration engine executed by the webserver;

initiate, by the initiator service and at the workflow orchestration engine, a workflow via an application programming interface ("API"), wherein the workflow includes a plurality of activities, wherein the plurality of activities includes creating a participant profile and registering network settings of the customer's device;

register, by the workflow orchestration engine, the workflow in a unique namespace associated with the customer device that is isolated from other workflows and executes concurrently with the other workflows, the other workflows including a plurality of other requests and associated data received by the onboarding service from other customer devices;

generate, by the workflow orchestration engine, a worker instance of a plurality of worker instances in an application-level container that virtualizes an application execution environment so each worker instance of the plurality of work instances has a runtime environment, application library, and hardware allocation, the application-level container being part of a compute node executed by the webserver, wherein the workflow orchestration engine sends a parameter to the worker instance, wherein the compute node is one node in a plurality of cluster nodes managed by a cluster service that balances load among the plurality of cluster nodes and provides redundancy among the cluster nodes;

send, to the worker instance, a task of a plurality of tasks of an activity of the plurality of activities for completion of the task by the worker instance according to the parameter, wherein the task is associated with setting a network configuration;

receive, by the workflow orchestration engine, an additional request and additional data;

generate, by the workflow orchestration engine, a second activity of the plurality of activities to send to the worker instance for completion, wherein the worker instance is in an idle state until it receives required data;

communicate, through an API call, by the worker instance with a network configuration service, to provide one or more parameterized network settings to the network configuration service;

generate, by the network configure service, based on the workflow and an administrative participant profile configuration associated with the participant profile, the administrative participant profile configuration including registering a participating organization's internet protocol (IP) address and domain name and configuring a platform firewall for receiving traffic from the customer device based on the parameterized network settings and the workflow;

executing, by the compute node, the plurality of tasks by the work instance in the application-level container in a defined sequence, wherein the work calls to the network configuration service to complete the task;

indicate, by the worker instance and to the workflow orchestration engine that the activity is complete; and persist, by the workflow orchestration engine, state data for the workflow in the datastore, wherein the state data for the workflow includes an indication that that the activity is complete.

4. The system of claim 3, wherein the workflow is one of a plurality of workflows predefined at the workflow orchestration engine.

5. The system of claim 3, wherein the worker instance corresponds to a customer from which the request and data were received.

6. A non-transitory computer readable storage medium, including instructions stored thereon, which when read and executed by one or more computers cause the one or more computers to perform steps comprising:

receiving a request and data at an onboarding service executed by a webserver comprising one or more processors and from a webpage interface executed on a customer device comprising one or more processors;

sending the request and data from the onboarding service to an initiator service, wherein the webpage interface includes the initiator service and the initiator service stores the data in a datastore, wherein the initiator service is a channel between the onboarding service and a workflow orchestration engine executed by the webserver;

initiating, by the initiator service and at the workflow orchestration engine, a workflow via an application programming interface ("API"), wherein the workflow includes a plurality of activities, wherein the plurality of activities includes creating a participant profile and registering network settings of the customer's device;

registering, by the workflow orchestration engine, the workflow in a unique namespace associated with the customer device that is isolated from other workflows and executes concurrently with the other workflows, the other workflows including a plurality of other requests and associated data received by the onboarding service from other customer devices;

generating, by the workflow orchestration engine, a worker instance of a plurality of worker instances in an application-level container that virtualizes an application execution environment so each worker instance of the plurality of work instances has a runtime environment, application library, and hardware allocation, the application-level container being part of a compute node executed by the webserver, wherein the workflow orchestration engine sends a parameter to the worker instance, wherein the compute node is one node in a plurality of cluster nodes managed by a cluster service that balances load among the plurality of cluster nodes and provides redundancy among the cluster nodes;

sending, by the workflow orchestration engine and to the worker instance, a task of a plurality of tasks of an activity of the plurality of activities for completion of the task by the worker instance according to the parameter, wherein the task is associated with setting a network configuration;

communicating, through an API call, by the worker instance with a network configuration service, to provide one or more parameterized network settings to the network configuration service;

receiving, by the workflow orchestration engine, an additional request and additional data;

generating, by the workflow orchestration engine, a second activity of the plurality of activities to send to the worker instance for completion, wherein the worker instance is in an idle state until it receives required data;

generating, by the network configure service, based on the workflow and an administrative participant profile configuration associated with the participant profile, the administrative participant profile configuration including registering a participating organization's internet protocol (IP) address and domain name and configuring a platform firewall for receiving traffic from the customer device based on the parameterized network settings and the workflow;

executing, by the compute node, the plurality of tasks by the work instance in the application-level container in a defined sequence, wherein the work calls to the network configuration service to complete the task;

indicating, by the worker instance and to the workflow orchestration engine that the activity is complete; and persisting, by the workflow orchestration engine, state data for the workflow in the datastore, wherein the state data for the workflow includes an indication that that the activity is complete.

* * * * *